April 11, 1961

I. I. KLEIN 2,979,198

APPARATUS FOR CLASSIFYING LIGHT-WEIGHT OBJECTS

Filed May 13, 1958

INVENTOR.
IRVIN I. KLEIN.

BY
Brown, Critchlow, Flick & Peckham
his ATTORNEYS.

April 11, 1961     I. I. KLEIN     2,979,198
APPARATUS FOR CLASSIFYING LIGHT-WEIGHT OBJECTS
Filed May 13, 1958     3 Sheets-Sheet 2

INVENTOR.
IRVIN I. KLEIN.
BY Brown, Critchlow, Flick & Peckham
his ATTORNEYS.

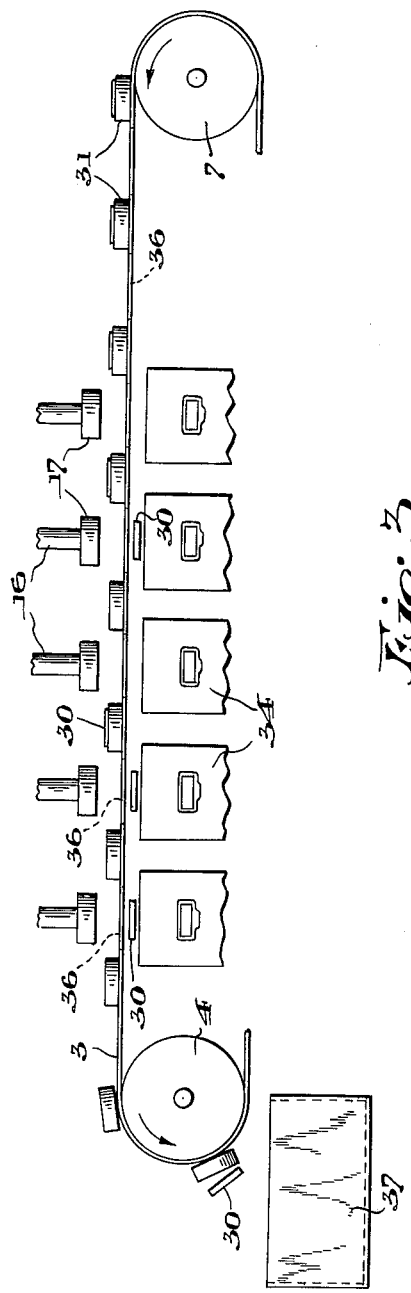

United States Patent Office 2,979,198
Patented Apr. 11, 1961

2,979,198

APPARATUS FOR CLASSIFYING LIGHT-WEIGHT OBJECTS

Irvin I. Klein, Baltimore, Md., assignor to Catalyst Research Corporation, a corporation of Maryland Filed May 13, 1958, Ser. No. 734,901

5 Claims. (Cl. 209—74)

This invention relates to the classification, according to weight, of light-weight objects, and more particularly to automatic apparatus for that purpose.

Where light-weight objects, especially those that are very small or fragile and consequently difficult to handle, are made in large quantities and must be grouped or classified according to weight, difficulties arise. Although each object can be weighed individually on scales, that is very time-consuming and really out of the question for large scale production. There also is a highly damped electronic balance that is more or less automatic, but it is very intricate, and extremely expensive.

It is among the objects of this invention to provide classifying apparatus which is simple in construction and operation, which can be loaded in a simple manner, which requires no unloading mechanism, which can operate at a speed that is practical for large scale production, which is easily adjusted to classify according to any desired gradations in weight, and which is suited to any desired number of classifications.

In accordance with this invention, a straight-line or circular conveyor is provided with a line of uniformly spaced supports. A short way above the conveyor, there is a line of downwardly facing suction heads that are spaced apart the same distance as the supports. Means are provided for indexing the conveyor to position some of the supports first directly beneath the heads and then between them. During the period that the supports are beneath the heads, the heads are connected with a source of vacuum in order to lift light-weight objects from the supports. As soon as the conveyor moves ahead, the vacuum is shut off and any lifted objects are released from the heads and dropped between the supports into or onto receiving means. Preferably, the conveyor is provided between the supports with openings, through which the objects fall when released from the suction heads. Means are provided for controlling the vacuum to the different heads in such a manner as to produce more suction at each successive head in the direction of movement of the line of supports, so that an object too heavy to be lifted by the first head may be lifted by a succeeding one.

The preferred embodiment of the invention is illustrated in the accompanying drawings, in which Fig. 1 is a side view of my apparatus showing objects lifted from some of the supports on the conveyor;

Fig. 3 is a fragmentary side view showing the conveyor indexed ahead one step and the previously lifted objects falling from the suction heads.

Figure 1:
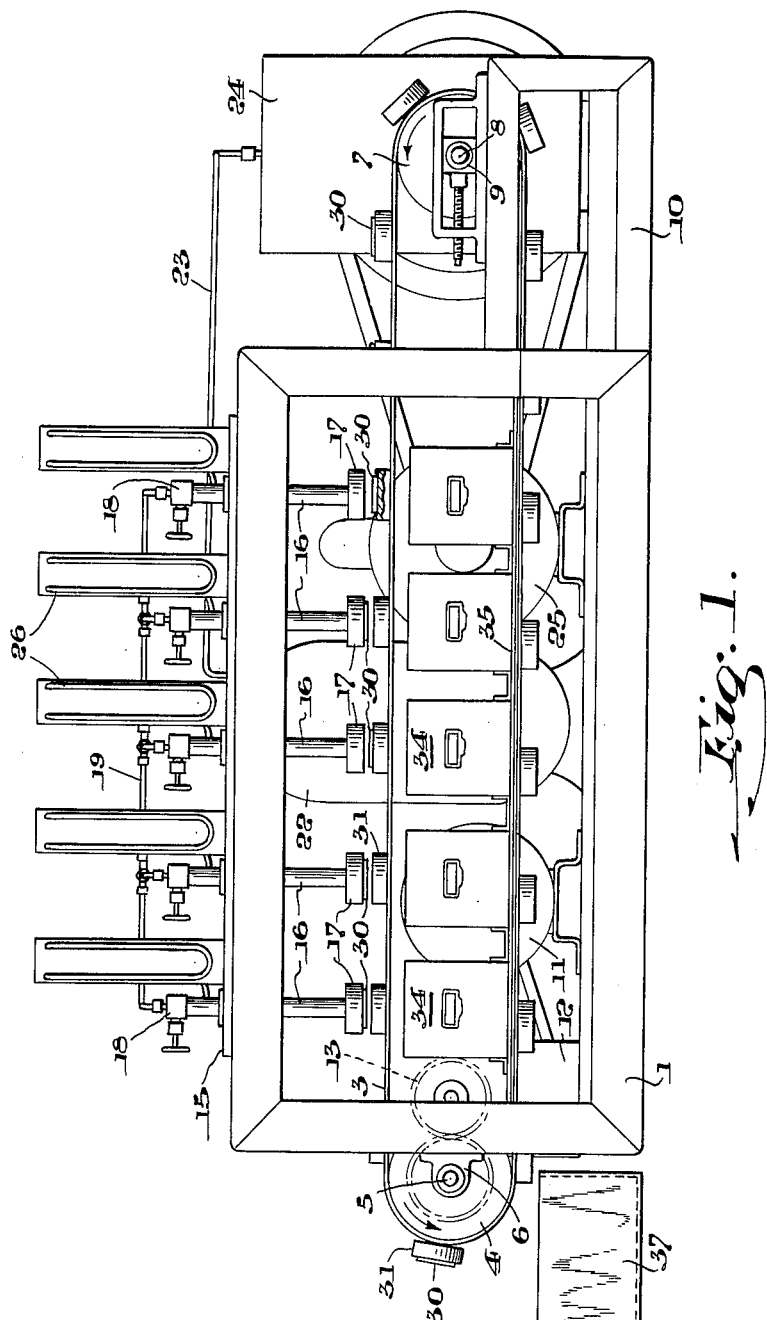
Figure 2:
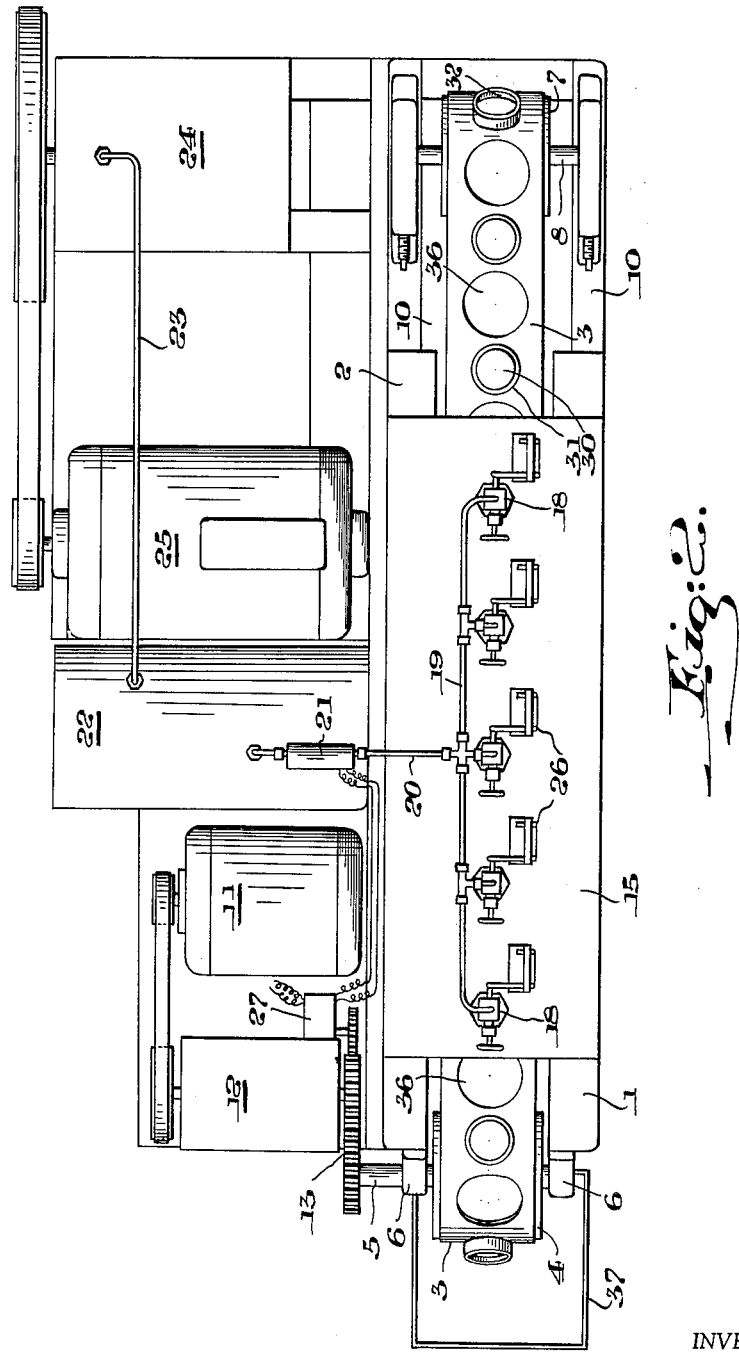
Fig. 2 is a plan view of the apparatus.

Referring to Figs. 1 and 2 of the drawings, a pair of parallel rectangular side frames 1 and 2 have an endless conveyor belt 3 extending lengthwise between them. The front portion of the belt is supported by and travels around a drum 4 rigidly mounted on a horizontal shaft 5 journaled in bearings 6 attached to the front ends of the side frames. The opposite end of the belt travels around another drum 7 mounted on a shaft 8 journaled in take up bearings 9 adjustably mounted on supports 10 projecting from the rear ends of the frames. The belt is driven by an electric motor 11 mounted behind the frames and operating an intermittent gear drive unit 12 that is operatively connected through a pair of gears 13 with the rear end of the front shaft 5 of the conveyor to thereby index the belt step by step. Drive unit 12 is an old and well-known construction.

Mounted on top of the two side frames is a horizontal plate 15 that supports a central line of uniformly spaced vertical pipes 16 extending down between the frames. Each pipe carries a head 17 at its lower end, the heads having vertical passages through them which communicate with the pipes. Mounted on the upper end of each pipe is a conventional throttle valve 18 connected with a header 19 that is connected by a tube 20 to a normally closed solenoid valve 21 of any well-known construction. This valve is connected with a vacuum surge tank 22 located beside the conveyor motor. The tank is connected by a tube 23 with a conventional vacuum pump 24 driven by a motor 25 between it and the tank. While the pump is being operated and the solenoid valve is open, air is drawn up through heads 17 to create suction at their lower faces. The amount of suction that is created at each head is adjusted by the throttle valve associated with it and can be read on a manometer 26 connected with that valve. The suction is adjusted to be the least at the first head in line and to be greater at each successive head in the direction of movement of the belt, whereby the last head in line produces the most suction. The solenoid valve is opened periodically by suitable timing mechanism 27 such as known in the art, which may be driven from gears 13 if desired.

The conveyor belt carries a central line of supports for the objects that are to be classified by this apparatus. The supports may take various forms, a suitable one for a circular disc 30 being a cylindrical member 31 provided in its outer face with a circular depression 32 to center the disc thereon. The supports are spaced apart the same distance as the suction heads, and the intermittent gear drive is arranged to index the belt ahead to move a group of the supports directly beneath the heads first and then forward half way between them (Fig. 3).

When this apparatus is put in operation, the objects 30 to be classified are fed in any suitable manner, one at a time, to each successive support on the belt. When one of these objects is carried beneath the first suction head, the solenoid valve is opened by timer 27 to connect all of the heads with the vacuum surge tank. At that time the object will be lifted from its support only if it is light enough for the suction at the first head to draw it up against that head. If the object is too heavy for that purpose, it will remain on the support and be carried forward to the next head. The object may be lifted from its support by the second head, or, if still too heavy, will be carried forward to the next head. If the object is too heavy to be lifted by any of the heads, it will fall off its support as it passes around the front drum of the conveyor.

Assuming that at a given moment one or more objects have been lifted from their supports while positioned below the heads, the belt is then indexed forward to position the supports between the heads. At that moment the solenoid valve 21 will shut off communication between the surge tank and the heads and admit atmospheric pressure to the heads. This will release the lifted objects from the heads and they will fall into or onto collecting means. The means for receiving or catching the falling objects may be boxes or bins 34 between the upper and lower lengths of the belt. The bins can be slidably mounted on a horizontal plate 35 connected to the two side frames. In such a case it is necessary to provide the belt between each pair of supports with an opening 36 considerably larger than the objects being classified. At the time that the vacuum is released, these openings are directly below the suction heads, so the objects can drop from the suction heads through the belt and into the bins. Any objects not lifted by the heads but falling off the front end of the belt can also be caught in a box 37 if desired. It will be seen that with this apparatus each bin will contain objects, the weight of which is substantially uniform but different from the weight of the objects in each of the other bins.

In classifying coated paper discs, for example, for one known purpose, they must weigh between 620 and 650 milligrams. Any below or over that weight cannot be used. With this apparatus the first suction head can be set to lift only discs that weigh less than 620 milligrams. The second head can be adjusted to lift discs weighing about 620 milligrams. The third one will lift those weighing about 630 milligrams, the fourth about 640 and the fifth about 650 milligrams. Those heavier than 650 milligrams will pass through the machine and be deposited in box 37 at the front end of the belt. At the moment of operation illustrated by Fig. 1, it will be seen that the discs beneath the second, fourth and fifth suction heads have been drawn up against those heads. The belt is then indexed forward one step to locate the belt openings directly beneath the heads. As valve 21 closes at this time, the raised discs are released from the three heads and are shown after they have dropped through the belt and are falling into the underlying classification bins. A disc that was too heavy to be lifted by any of the heads is shown falling into the end box 37.

It will be seen that this apparatus is simple and is foolproof in operation. It unloads automatically and is fully adjustable for various weight gradations. It can be provided with any desired number of suction heads for as many weight classifications as one may wish.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Apparatus for classifying light-weight objects according to a conveyor provided with a line of uniformly spaced supports, a line of downwardly facing suction heads a short distance above said line of supports and spaced apart the same distance as said supports, each of the heads having a passage therethrough open at the bottom of the head, each support in said first-mentioned line when moving passing underneath and close to each successive suction head in said second-mentioned line, means for indexing the conveyor to position supports first directly beneath said heads and then between them, each support being adapted to receive one of said objects before that support is indexed beneath any of said heads, means for connecting the upper ends of said head passages simultaneously with a source of vacuum when the supports are indexed beneath the heads and for maintaining the vacuum until the supports are moved between the heads, whereby the objects lifted from the supports by the heads will be dropped between the supports when the latter are indexed between the heads, and means for receiving objects dropped from the heads, said connecting means including means for controlling the vacuum to the heads to produce more suction at each successive head in the direction of movement of the line of supports so that an object too heavy to be lifted from a support by the first head may be lifted by a succeeding head.

2. Apparatus for classifying light-weight objects according to weight, comprising a conveyor provided with a line of uniformly spaced supports with uniformly spaced openings between them larger than said objects, a line of downwardly facing suction heads a short distance above said line of supports and spaced apart the same distance as said supports, each of the heads having a passage therethrough open at the bottom of the head, each support in said first-mentioned line when the conveyor is moving passing underneath and close to each successive suction head in said second-mentioned line, means for indexing the conveyor to position supports and then openings directly beneath said heads, each support being adapted to receive one of said objects before that supports is indexed beneath any of said heads, and means for connecting the upper ends of said head passages simultaneously with a source of vacuum when the supports are indexed beneath the heads and for maintaining the vacuum until the supports are moved between the heads, whereby the objects lifted from the supports by the heads will be dropped through said openings when the latter are indexed beneath the heads, said connecting means including means for controlling the vacuum to the heads to produce more suction at each successive head in the direction of movement of the line of supports so that an object too heavy to be lifted from a support by the first head may be lifted by a succeeding head.

3. Apparatus according to claim 2, in which said conveyor is an endless belt having upper and lower lengths traveling in opposite directions, and means are disposed between said belt lengths beneath said heads for receiving objects dropped through said openings in the upper length of the belt.

4. Apparatus for classifying light-weight objects according to weight, comprising a conveyor provided with a line of uniformly spaced supports, a line of downwardly facing suction heads a short distance above said line of supports and spaced apart the same distance as said supports, each of the heads having a passage therethrough open at the bottom of the head, each support in said first-mentioned line when moving passing underneath and close to each successive suction head in said second-mentioned line, means for indexing the conveyor to position supports first directly beneath said heads and then between them, each support being adapted to receive one of said objects before that support is indexed beneath any of said heads, and means for connecting the upper ends of said head passages simultaneously with a source of vacuum when the supports are indexed beneath the heads and for maintaining the vacuum until the supports are moved between the heads, whereby the objects lifted from the supports by the heads will be dropped between the supports when the latter are indexed between the heads, said connecting means including a separate valve between each head and said vacuum source, each successive valve in the direction of movement of the line of supports being open more than the preceding valve so that an object too heavy to be lifted from a support by the first head may be lifted by a succeeding head.

5. Apparatus for classifying light-weight objects according to weight, comprising a conveyor provided with a line of uniformly spaced supports, a line of downwardly facing suction heads a short distance above said line of supports and spaced apart the same distance as said supports, each of the heads having a passage therethrough open at the bottom of the head, each support in said first-mentioned line when moving passing underneath and close to each successive suction head in said second-mentioned line, means for indexing the conveyor to position supports first directly beneath said heads and then between them, each support being adapted to receive one of said objects before that support is indexed beneath any of said heads, a source of vacuum, conduit means connecting said source with all of said heads, a normally closed valve in said conduit means cutting off the heads from said vacuum source, means for opening the valve every time said supports are indexed beneath the heads and for maintaining the valve open until the supports are moved between the heads, whereby to enable the heads to first lift objects from the supports and then drop them between the supports, means for receiving objects dropped from the heads, and means for controlling the vacuum to the individual heads while said valve is open to produce more suction at each successive head in the direction of movement of the line of supports so that an object too heavy to be lifted from a support by the first head may be lifted by a succeeding head.

References Cited in the file of this patent

UNITED STATES PATENTS

| | | |
|---|---|---|
| 1,139,070 | Phelps | May 11, 1915 |
| 1,987,336 | Powell | Jan. 8, 1935 |
| 2,106,407 | Hensley | Jan. 25, 1938 |
| 2,176,784 | Bowden | Oct. 17, 1939 |
| 2,766,879 | Draper | Oct. 16, 1956 |
| 2,812,061 | Pfister | Nov. 5, 1957 |

FOREIGN PATENTS

| | | |
|---|---|---|
| 879,173 | Germany | June 11, 1953 |
| 83,606 | Sweden | June 12, 1935 |